(12) United States Patent
Drape et al.

(10) Patent No.: US 7,518,829 B1
(45) Date of Patent: Apr. 14, 2009

(54) MULTI-RADIUS RAILS FOR LOAD BEAMS ON DISK DRIVE SUSPENSION ASSEMBLIES

(75) Inventors: Rick Drape, Hutchinson, MN (US); Duane A. Lundin, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 481 days.

(21) Appl. No.: 11/211,801

(22) Filed: Aug. 25, 2005

(51) Int. Cl.
 *G11B 5/48* (2006.01)
(52) U.S. Cl. .................................... 360/244.2
(58) Field of Classification Search .............. 360/244.2, 360/244.9
See application file for complete search history.

(56) References Cited

U.S. PATENT DOCUMENTS

| | | | | |
|---|---|---|---|---|
| 5,844,752 | A * | 12/1998 | Bozorgi et al. | 360/244.9 |
| 5,850,319 | A * | 12/1998 | Tangren | 360/244.9 |
| 6,219,203 | B1 * | 4/2001 | Arya et al. | 360/244.2 |
| 2003/0086207 | A1 * | 5/2003 | Watadani et al. | 360/244.9 |
| 2005/0201014 | A1 | 9/2005 | Fujimoto | |

FOREIGN PATENT DOCUMENTS

JP 2005-32393 A 2/2005

OTHER PUBLICATIONS

Engineering Drawing, "Loadbeam Etched 2130L, Dwg. No. 0216620," Hutchinson Technology Inc., 1 sheet (1997).
Spec Sheet, "18 mm Load Beam Progression," Hutchinson Technology Inc., 1 sheet (Feb. 4, 1997).
Engineering Drawing, "Assembly 2130-NF5D, Dwg. No. 0210434," Hutchinson Technology Inc., 1 sheet (1997).
Engineering Drawing, "Loadbeam Etched 2130L, Dwg. No. 0213352," Hutchinson Technology Inc., 1 sheet (1996).

* cited by examiner

*Primary Examiner*—Tianjie Chen
(74) *Attorney, Agent, or Firm*—Faegre & Benson LLP

(57) ABSTRACT

A load beam or load beam component for a disk drive suspension assembly having a rigid region with concurrently formed side rails and sag region. The side rails have a plurality of segments with a smooth transition between segments. The side rails can have at least one segment with an arcuate shape. A method of forming the load beam or load beam component includes providing a metal forming tool and operating the tool to form the side rails and sag region concurrently.

9 Claims, 7 Drawing Sheets

MULTI-RADIUS RAILS FOR LOAD BEAMS ON DISK DRIVE SUSPENSION ASSEMBLIES

FIELD OF THE INVENTION

The present invention relates generally to the field of head suspension assemblies for disk drives. More particularly, the invention relates to load beams for the head suspension assemblies.

BACKGROUND OF THE INVENTION

Information storage devices typically include a magnetic head for reading and/or writing data onto the storage medium, such as a disk within a rigid disk drive. An actuator mechanism is used for positioning the head at specific locations or tracks in accordance with the disk drive usage. Disk drive suspensions are provided between the actuator and the magnetic head to support the head in proper orientation relative to the disk surface.

In a rigid disk drive, head suspensions are provided which support a read/write head to "fly" over the surface of the rigid disk when it is spinning. Specifically, the head is typically located on a slider having an aerodynamic design so that the slider flies on an air bearing generated by the spinning disk. In order to establish the fly height, the head suspension is also provided with a spring force counteracting the aerodynamic lift force.

A head suspension of the type used in a rigid disk drive includes a load beam and a flexure to which the slider is mounted. The flexure is provided at the distal end of the load beam and permits pitch and roll movements of the slider to follow disk surface fluctuations. A preformed bend or radius is made in the spring region of the load beam to provide the spring force to the rigid region of the load beam for counteracting the aerodynamic lift force against a slider. The radius provides the spring force and thus a desired gram loading to the slider for a predetermined offset height, the offset height being a measurement of the distance between the mounting height of the head suspension and the slider at "fly" height. The load beam is attached to an actuator, which positions the load beam so that the magnetic head can read and/or write data to the hard disk. The data on hard disks are stored on tracks on the disk surface. As hard disks become more and more miniaturized, resulting in tracks that are positioned closer and closer together, and actuators are required to move suspension assemblies more quickly, suspension components, such as load beams, necessarily need to become smaller and have less mass.

As innovations in the disk drive industry push toward smaller drives with more closely positioned tracks and faster spinning disks, it becomes more and more advantageous to provide suspension components that are smaller and lighter so that the actuators can move the suspensions faster while requiring less power. As the disk drive suspensions become smaller and lighter and as the disk drives spin faster, the disk drive suspensions and suspension components are more and more susceptible to the effects of shock and vibration. Specifically, the suspensions and suspension components are susceptible to torsional responses and lateral responses, known as windage, from the motion of air that results from the spinning disks.

The response of the head suspension and suspension components at resonant frequencies can lead to unacceptable off-track error when attempting to read and/or write to the disk drive, unless the head suspension is designed to minimize the effects of vibration response at the resonant frequencies. Thus, it is desirable to design head suspensions to optimize performance even at resonant frequencies, to minimize the effects of the lateral bending mode and the torsional modes. More particularly, it is preferable to increase certain resonant frequencies to be higher than the vibrations experienced in the disk drive application. Additionally, it is desirable to reduce or eliminate the movement or gain of the magnetic head at the resonant frequencies of the head suspension or suspension components.

Torsional and lateral bending modes are beam modes that are dependent on cross-sectional properties along the length of the load beam. These modes also result in lateral movement of the slider at the end of the head suspension assembly. Torsional modes sometimes produce a mode shape in which the tip of the resonating head suspension assembly moves in a circular fashion. However, since the slider is maintained at an offset height by the stiffness of the applied spring force, primarily lateral motion of the rotation is seen at the slider. The lateral bending mode (often referred to as "sway") is primarily lateral motion. It is typically desirable to control the resonant frequency of the lateral bending mode so that it is higher than the frequencies that are experienced in the disk drives within which they are to be used.

Torsional modes typically occur at lower frequencies than lateral bending modes, but typically have less of a lateral effect. Torsional modes are further subdivided depending on the number, if any, of nodes present along the length of the suspension assembly between a fixed end thereof and its free end. The slider would be supported near the free end. These various torsional mode shapes occur at different resonant frequencies. A single twist of the head suspension between a fixed end and its free end is referred to as first torsion mode. The off-track motion at the first torsion resonant frequency is the first torsional gain. Second torsional mode means a torsional mode shape having a single node along the length of the suspension between its fixed end and its free end. The position of the node divides the head suspension into first and second twisting motions on either side of the node point. Second torsional resonant frequencies occur at higher frequencies than the first torsional mode. Higher order torsional modes, i.e., third torsional mode having two node points, etc., typically occur at frequencies higher than those experienced within a disk drive environment.

To provide a high lateral bending frequency, the head suspension needs to be stiff in both the lateral direction and torsionally along the entire length of the head suspension. If a head suspension is designed with only one of these conditions in mind, the head suspension may have a low resonant frequency of torsional or lateral bending with a high degree of off-track motion or gain. A head suspension having a high lateral stiffness but a low torsional stiffness will not move strictly laterally due to the high lateral stiffness, but may twist at a lower resonant frequency. If the head suspension has high torsional stiffness and low lateral stiffness, the head suspension may deflect primarily laterally at a lower resonant frequency.

A number of design approaches have been used to improve the lateral and torsional vibration response of load beams, especially with respect to load beams that incorporate thinner materials. One approach is to align the notch responses of the different vibration modes to reduce the gain or movement of the load beam at the resonant frequencies. The notch response for a particular vibration mode is the minimum gain at the resonant frequency of the mode. It is desirable to align the notch response for both the lateral mode and torsional modes to improve the response of the load beam at the resonant frequencies.

One known approach used to align notches is to form a so-called "sag" bend across the rigid region of the load beam. By adding the sag bend to a load beam, it is possible to properly align the center of rotation of the suspension assembly with respect to the load point dimple and align first and second torsional notch responses. However, as load beam materials become thinner (load beams having a thickness of less than 40 µm are now common) and as the mass of load beams are reduced by removing material along a major surface of the load beam, it becomes increasingly difficult to incorporate a sag bend across the major surface.

Another known approach is to design a load beam with a top profile to reduce the effects of vibration. Alternatively, or in addition, stiffening plates can be attached to the rigid region of a load beam to improve vibration response. Approaches of these type are described in U.S. Pat. No. 5,850,319, which is hereby incorporated by reference. Still other approaches have included adding rails along the edges of the rigid region of the load beam to stiffen the load beam. A number of approaches have used rails along the edges of rigid regions having a top profile that is defined by one or more linear segments. In other applications, side rails more than one segment have been incorporated onto load beams with a transition region between linear segments. It has been recognized in at least some of these load beams that the transition point becomes a weak point with respect to withstanding respect to resonant response relative to the remainder of the rails.

What is needed are disk suspension assemblies and assembly components that can be made of thinner materials and yet have improved vibration response with respect to lateral and torsional excitation. Such assemblies and assembly components should be efficient to manufacture.

SUMMARY OF THE INVENTION

The invention is directed toward a load beam or load beam component for a disk drive suspension assembly having a rigid region with concurrently formed side rails and sag region. The rigid region includes a major surface with first and second side rails that have a plurality of segments with a smooth transition region between each of the segments. The rigid region can include apertures formed through the rigid region. The sag region is located adjacent to the transition region of the side rails. One or more of the apertures can be positioned adjacent to the sag region.

The side rails can have at least one arcuate segment. More particularly, the side rails can have an arcuate segment with a convex or a concave shape with respect to a longitudinal axis of the load beam. In one aspect of the invention, the side rails have both a concave segment and a convex segment, with a smooth transition between the segments. The invention is also directed toward a method for forming a load beam or a load beam component for disk drive suspension assembly to form the side rails and sag region concurrently.

DETAILED DESCRIPTION OF THE INVENTION

Figure 1:
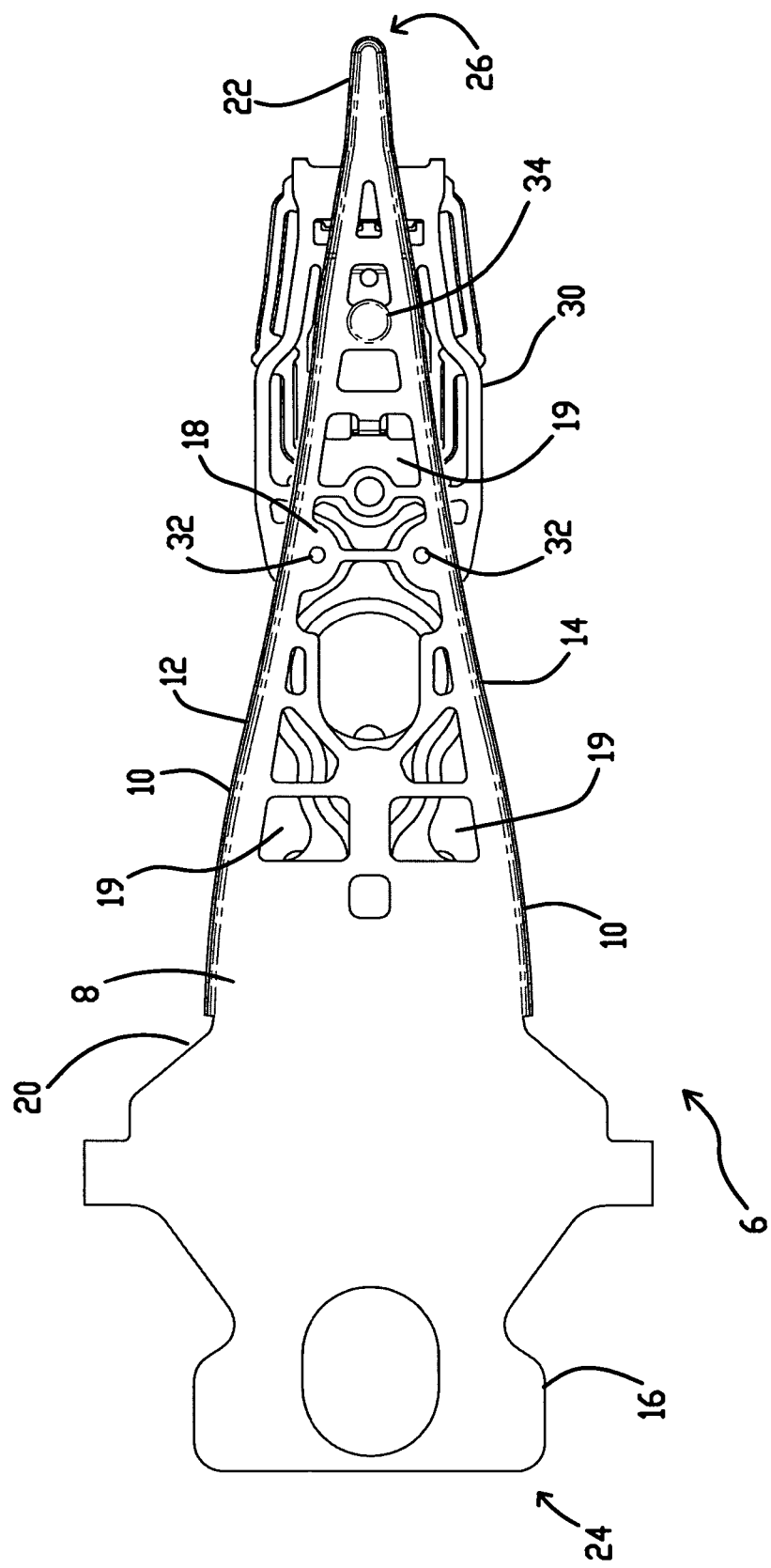
FIG. 1 is a top view of a portion of disk drive suspension assembly having a load beam with a rigid region having curved side rails in accordance with one embodiment of the invention.

FIG. 1 illustrates a disk drive suspension assembly 6 including a load beam 8 having side rails 10 extending along at least portions of a first edge 12 and a second edge 14 of the load beam for improving the frequency response of the assembly in accordance with one embodiment of the invention. Load beam 8 is formed from a material such as stainless steel or other acceptable materials and includes an actuator arm mounting region 16, a portion of which is illustrated in FIG. 1, on a proximal end 24 of the load beam. The actuator arm mounting region 16 is adapted to mount the load beam to an actuator arm (not shown). In addition, load beam 8 includes a rigid region 18 positioned distally from the actuator arm mounting region 16 and extending longitudinally toward a distal end 26 of the load beam. Load beam 8 also includes a spring region 20 positioned between the rigid region 18 and the actuator arm mounting region 16 for providing a spring force on the distal end 26 of the load beam. While the illustrated embodiment shows a load beam with a spring region 20 and rigid region 18 integrally formed from a single piece of material, alternative embodiments (not shown) have a spring region formed of a separate piece of material and attached to the rigid region 18. Load beam 8 further includes a headlift 22 extending distally from the rigid region 18. The side rails 10 extend continuously from the rigid region 18 of the load beam 8 to the headlift 22. Alternative embodiments of the invention (not shown) do not include a headlift. Rigid region 18 further includes a plurality of apertures 19 formed though the load beam material by removing material. The formation of the apertures 19 into the load beam reduce the mass of the load beam 8.

A flexure 30, which supports a slider having a magnetic head (not shown) for reading data from and writing data to a disk drive, is mounted to load beam 8. In one embodiment, the flexure 30 and the load beam 8 are welded together at one or more weld locations 32. The weld locations 32 are positioned to allow a portion of the flexure 30 to move generally freely with respect to the load beam 8. However, the load beam 8 contacts the flexure 30 at load point dimple 34 to transfer a force to the flexure to urge the flexure to maintain a generally parallel attitude and desired height with respect to the surface of a disk (not shown).

Figure 2:
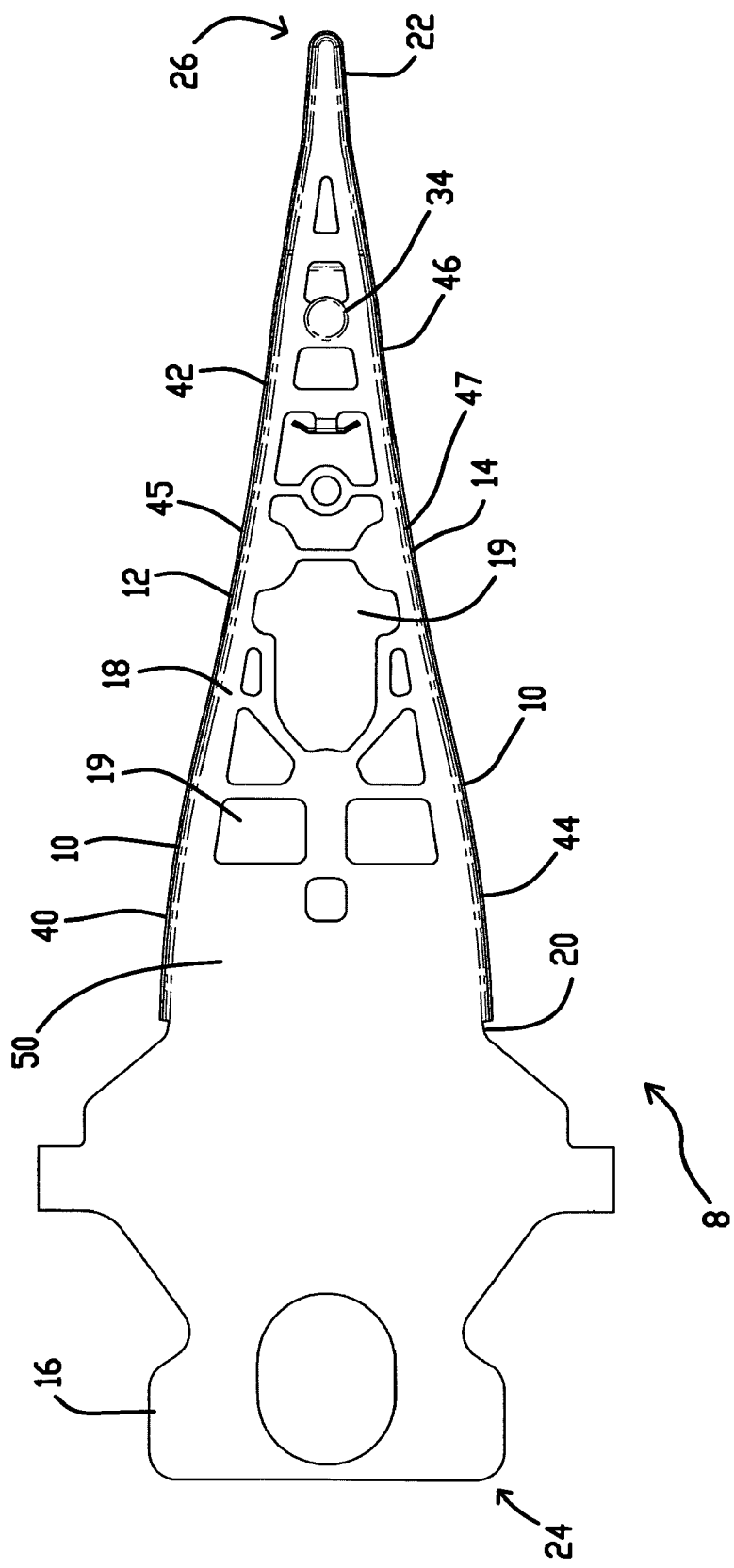
FIG. 2 is a top view of the load beam of FIG. 1 showing a major surface of the rigid region.

Referring to FIG. 2, the rigid region 18 of load beam 8 has a top profile defined by the shape of the first edge 12 and the second edge 14 as they extend distally from the spring region 20 toward the distal end 26 of the load beam 8. In one embodiment, the first edge 12 and second edge 14 each have a plurality of distinct segments. As illustrated, the first edge 12 of load beam 8 has an arcuate first segment 40 and an arcuate second segment 42. The first segment 40 has a concave shape with respect to a longitudinal center line of load beam. The second segment 42 has a convex shape with respect to the longitudinal center line of load beam. Between the first segment 40 and the second segment 42 is a transition region 45.

The transition region 45 has a smooth, continuous transition from the first segment 40 and the second segment 42. That is, the first segment 40 and the second segment 42 flow into each other in the transition region 45 without a discontinuous point at which the first segment 40 ends and the second segment 42 begins. Similarly, the second edge 14 has a first concave segment 44 and a convex second segment 46 with respect to the longitudinal center line of load beam and a smooth, continuous transition region 47 between them.

As described above, load beam 8 has side rails 10 that extend from a major surface 50 of load beam 8. The side rails 10 extend along the first edge 12 and the second edge 14, primarily along the rigid region 18 of the load beam 8. The side rails 10 extend from the rigid region 18 at a generally normal rail angle, although the rail angle may vary. Further, the rail angle may vary along the length of the side rails 10 as well. The side rails 10, like the first edge 12 and the second edge 14 from which they extend, have a plurality of distinct segments along the lengths of the side rails with smooth geometric transitions between the segments.

While the rigid region 18 of load beam 8 shown in FIG. 2 has arcuate first segments 40 and 44 that are concave and smoothly transition into arcuate second segments 42 and 46 that are convex along the first edge 12 and second edge 14, respectively, other embodiments of the invention can have different top profiles without departing from the scope of the invention. For example, in another embodiment (not shown), a load beam has first and second sides with one or more segments that are generally linear. In another embodiment (not shown), a load beam has first and second edges with more than two segments. In yet another embodiment (not shown), the load beam has first and second sides with more than two arcuate segments. In still another embodiment, (not shown) the load beam has first and second sides with two or more arcuate segments and at least one linear segment. In yet another embodiment (not shown), a load beam has a first edge with segments that are not complementary to a second edge, resulting in a top profile of the rigid region that is asymmetrical with respect to the longitudinal axis of the load beam. In still another embodiment (not shown), a load beam has a first edge with a different number of segments than the second edge. The embodiments described here are for illustrative purposes and are not intended to be limiting. In each of these embodiments, it is to be understood that side rails will extend from the major surface of the rigid region of the load beam.

Figure 3:
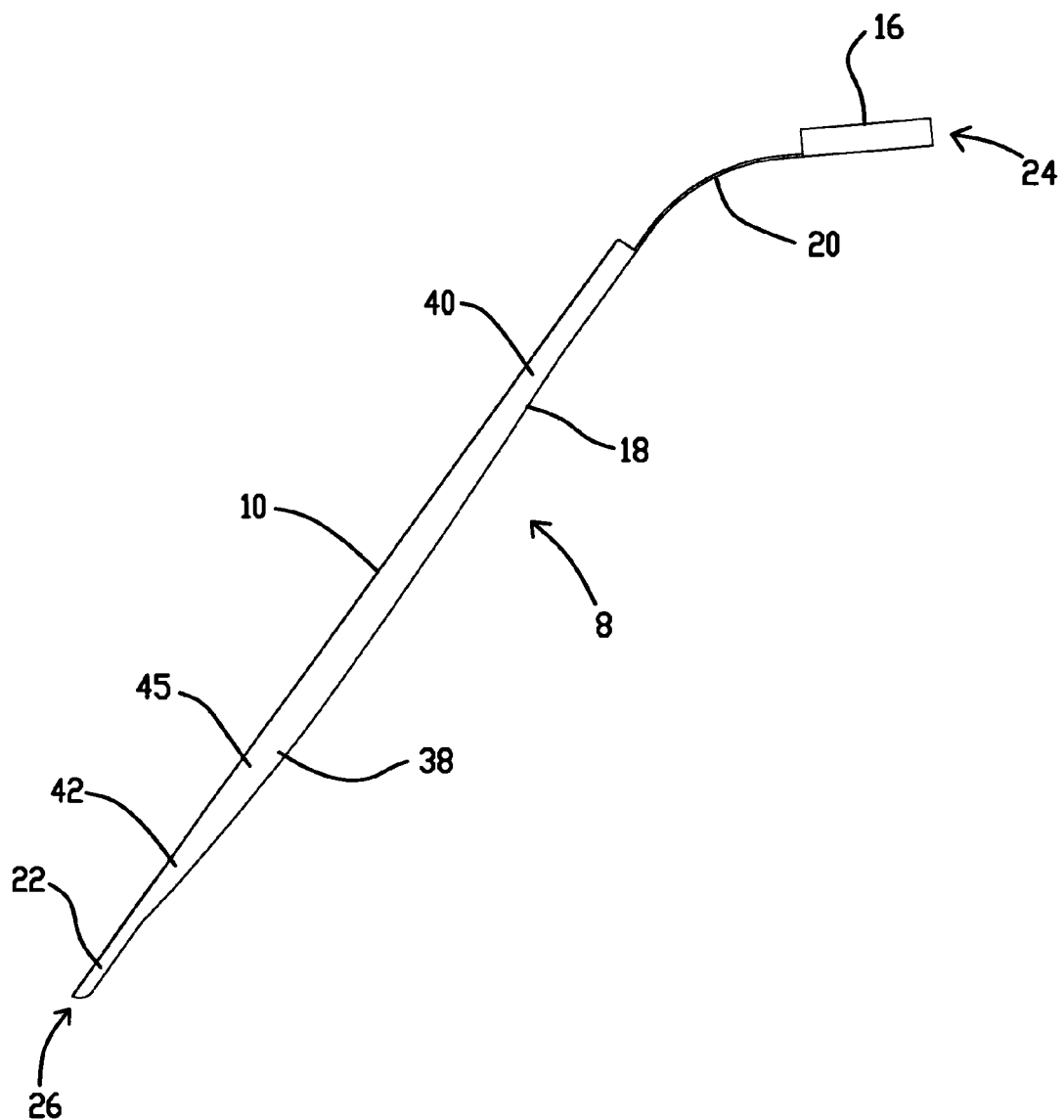
FIG. 3 is a schematic representation of a side view of the load beam of FIG. 1, illustrating a sag region in the major surface.
Figure 4:
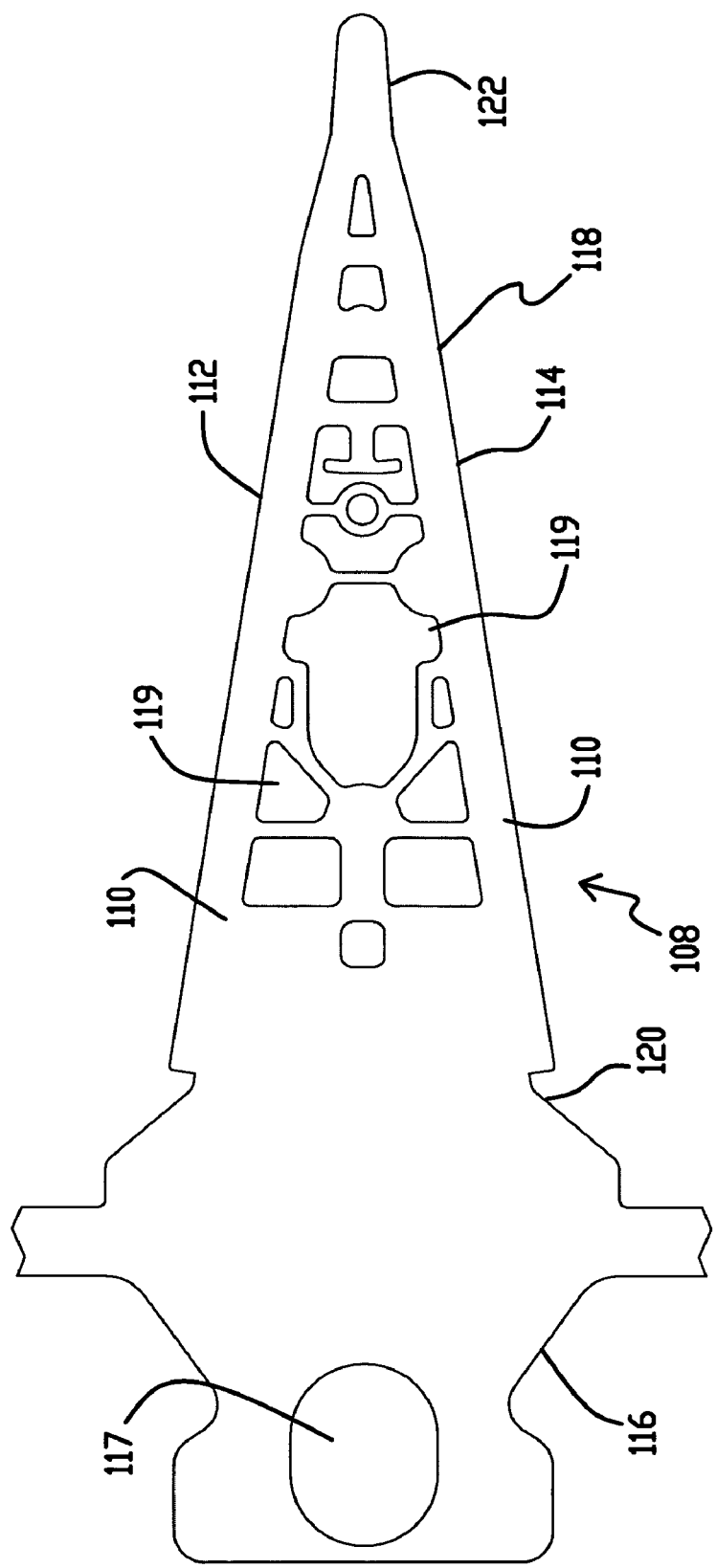
FIG. 4 is a flat pattern of a load beam precursor to be formed into a load beam in accordance with one embodiment of the invention.

FIG. 3 shows a side profile of the load beam 8, including an exaggerated representation of a sag region 38. Side rail 10 is shown extending from the proximal end to the distal end of the rigid region 18. The major surface 50 (shown in FIG. 2) of the rigid region 18 has a sag region 38, which is a bow in the major surface as opposed to a crease of the type found when metal is formed by introducing a bend. Rigid region 38 departs from the generally planar surface and compensates for the compression and tension required to form the side rails 10 of the current invention. Thus, the sag region 38 provides a way to incorporate multi-radius side rails into the rigid region and facilitates the alignment of torsional and lateral notches. The sag region 38 is located on the rigid region in proximity with the transition regions 45,47 (shown in FIG. 2) of the side rails 10, although the location of the sag region may vary. In one embodiment, the sag region 38 has a generally decreasing width as the sag region extends from the first edge 12 and the second edge 14 toward a centerline of the load beam. The side rails 10 have a height in the area of the sag region 38 that varies from the other portions of the side rails. In an alternate embodiment (not shown), the sag region has a generally constant width across the rigid region. In yet another embodiment (not shown), the sag region does not extend across the entire width of the rigid region. Instead, the rigid region has sag regions on each of the first and second sides of the rigid region. In yet another embodiment (not shown) the height of the side rails does not vary in the sag region from other portions of the side rails.

A number of factors contribute to aligning the torsional and the lateral notches, the importance of which is described above. These factors include the height and variation of height of the side rails 10, the shape of the top profile 28 and the corresponding segments of the side rails, the location of transition regions between the segments, the thickness of the load beam material, the number, shape, and position of the apertures formed into the load beam to reduce the overall mass of the load beam, and the sag of the load beam itself, including the location of the sag on the load beam. The sag regions 38 are introduced into the load beam to contribute to the alignment of the vibration notches and improving the resonance response of the load beam. The location of the sag regions 38 are preferably selected to interact with other design features such as the shape of the top profile and the height of the side rails to align the vibration notches.

Figure 5:
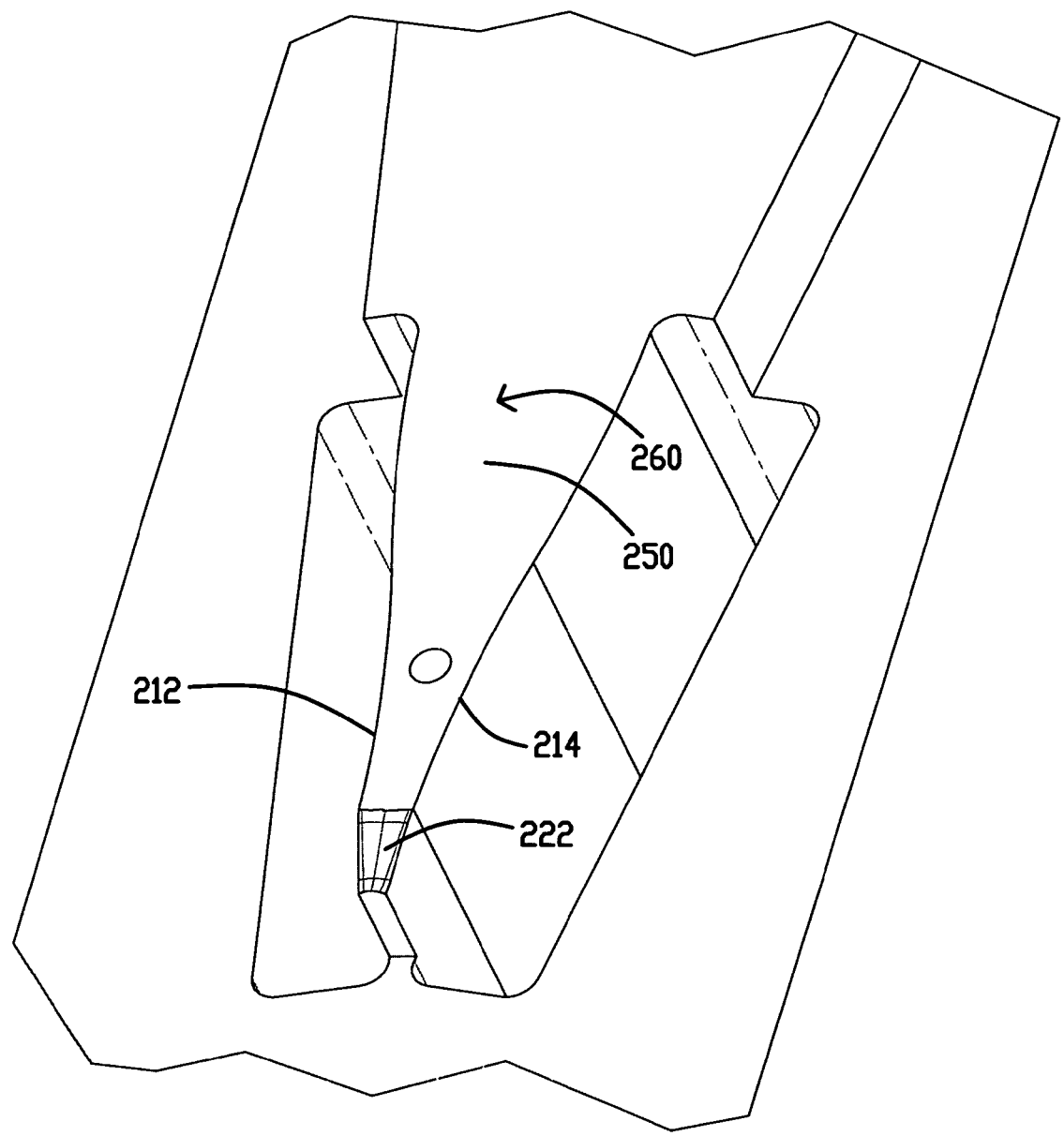
FIG. 5 illustrates a portion of a tool die for forming the load beam precursor of FIG. 4 into a load beam of the type shown in FIG. 1.

FIG. 5 illustrates a flat pattern 108 of material that is to be formed into load beam 8 with side rails 10 as shown in FIG. 2. Flat pattern 108 has been previously processed using known processes to create the features shown in FIG. 5. Flat pattern 108 is a precursor to the finished load beam 8, and includes a head lift region precursor 122, a rigid region precursor 118, a spring region precursor 120 and an actuator arm mounting region precursor 116. The actuator arm mounting region precursor 116 includes an aperture 117 formed into the flat pattern 108 for accepting a mounting arm (not shown). The rigid region precursor 118 includes apertures 119, a first side 112 having a side rail precursor 110 and a second side 114 likewise having a side rail precursor 110. The rigid region precursor 118 is connected to the actuator arm mounting region precursor 116 by a spring region precursor 120.

Figure 6:
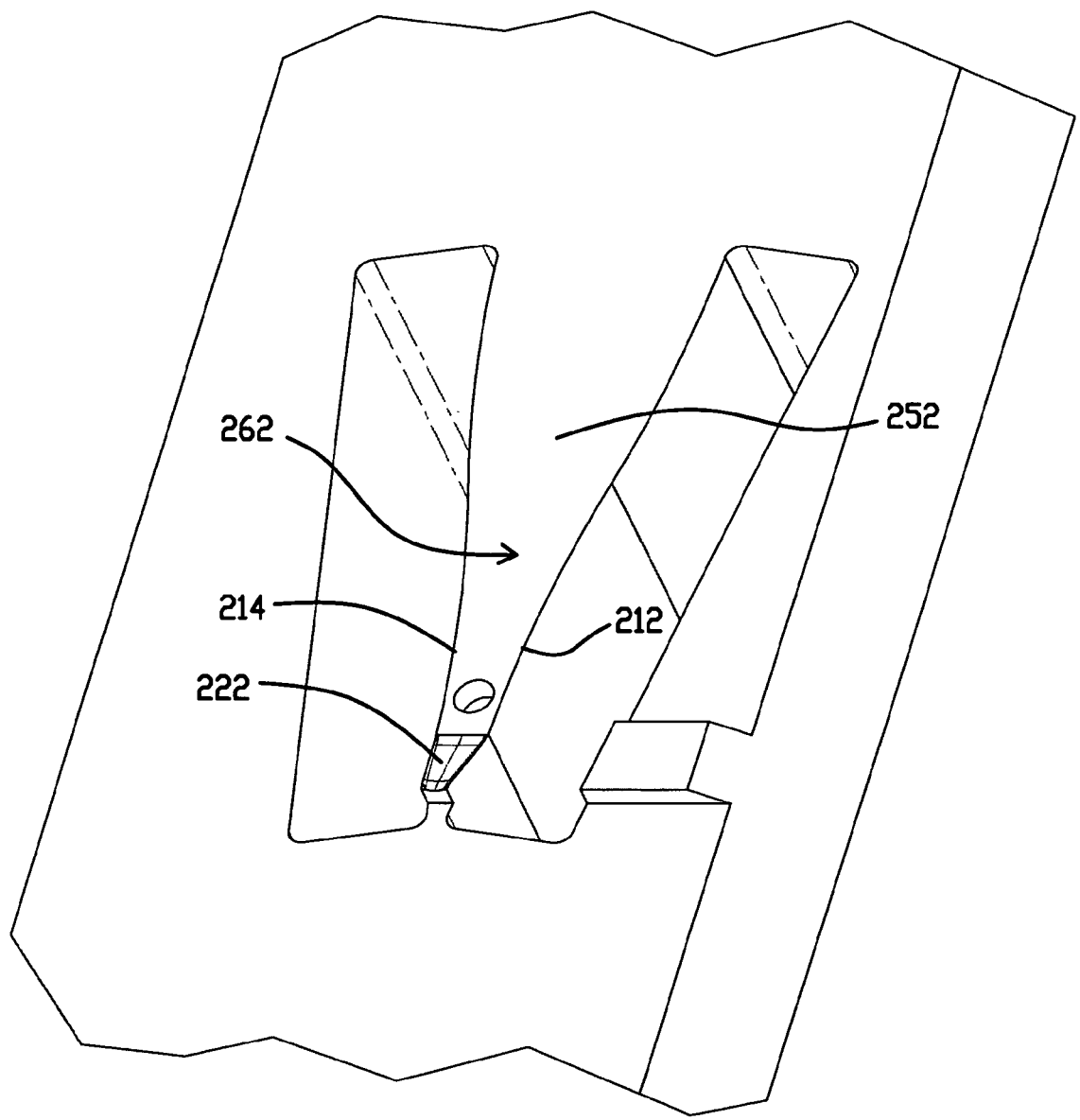
FIG. 6 illustrates another portion of the tool die designed to mate with the portion of FIG. 5.
Figure 7:
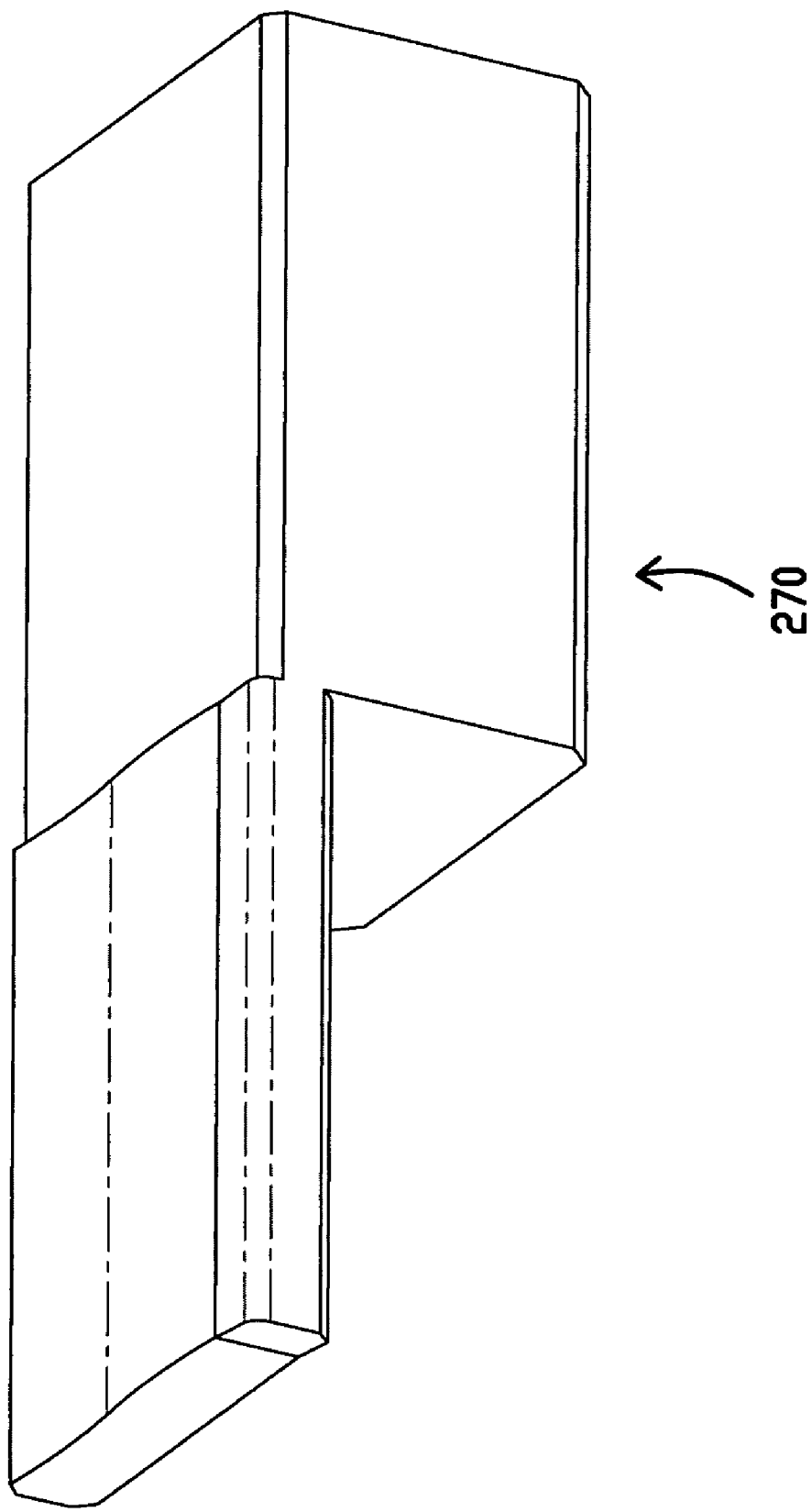
FIG. 7 is a punch to be used in conjunction with the tool die of FIGS. 5 and 6 for forming the flat pattern into the load beam.

FIGS. 6-8 illustrate tools used to form the flat pattern 108 into the load beam 8 having a top profile 28 and curved side rails 10. First tooling die portion 260 is shaped to receive the flat pattern 108 (not shown in FIGS. 6-7) on a major surface 250 of the first tooling die portion 260. Once the flat pattern 108 is positioned on the major surface 250 of the first tooling die portion 260, a second tooling die portion 262 having a major surface 252 is positioned on the opposing side of the flat pattern so that the major surface 252 is in communication with the flat pattern. The first tooling die portion 260 and the second tooling die portion 262 collectively position the flat pattern so that the side rail precursors 110 of the flat pattern 108 extend from a first side 212 and a second side 214 of the first tooling die portion. Then, a forming tool or punch 270 is employed to create a wiping motion to bend the flat pattern material extending out from between the first to tooling die portion 260 and the second tooling die portion 262. The wiping motion defines the shape of the top profile and forms the bend in the flat pattern 108 to form the side rails of load beam. Because of the nature of metal deformation, areas along the flat pattern will deform as the side rails are formed along the top profile. This deformation creates a natural sag region into the major surface of the rigid region as is described above. Thus, forming sag regions into the load beam is accomplished simultaneously with the same operation used to form the rails into the load beam. First tooling die portion 260 and second tooling die portion 262 collectively have a headlift portion 222, which enables a headlift to be formed into the load beam during the same process. Alternatively, the tooling die portions can be made without headlift forming portions for forming load beams without head lifts. The sag profile need not be formed into the surfaces 250 and 252 of the die portions 260 and 262.

Once the flat pattern has been formed to include a rigid region with multi-radius side rails, subsequent operations can be performed upon the flat pattern to complete the load beam. For example, the load point dimple can be formed into the flat pattern or the spring region can be formed, including forming a bend into the spring region. Alternatively, operations such as these may be performed prior to the step of forming the side rails, or alternatively again, simultaneously with the step of forming the side rails. Forming processes known in the art are used to form these features into the load beam.

The current invention provides a number of advantages. By providing an optimized top profile and curved rails extending from the rigid region of the load beam, the load beam can be designed to align the notch frequencies of the torsional modes of vibration, thereby reducing off track alignment of the magnetic head with respect to the disk and improving the performance of the disk drive assembly.

Providing side rails that extend along the optimized top profile has also resulted in reduced loadloss on the load beam or load beam component. Loadloss is the loss of gram force experienced the first time the suspension is stressed, for example, by "combing" a stack of suspensions mounted on an actuator arm so that the suspensions are properly positioned—that is, spaced apart—to merge into position relative to a corresponding stack of disks during assembly. Reducing the loadloss improves the ability of the suspension to counteract the increased aerodynamic lift force generated by faster spinning disk drives. In addition, the optimized top profile and side rails of the present invention have allowed for suspension designs having wider spring regions that improve the sway response of the suspension, improve stress distribution, and further reduce loadloss.

Further, by using a side rail of the current invention to improve stiffness, the load beam can be formed from thinner material and without stiffening plates, thereby reducing the mass and relatedly reducing the amount of power consumed to move the magnetic head into the proper position relative to the disk. In addition, the elimination of a separate manufacturing step of adding a sag bend across the major surface results in a more efficient manufacturing process and the ability to use thinner load beam materials having apertures formed into the major surface of the rigid region without the accompanying problems associated with introducing a sag bend across such a major surface.

The embodiments identified are for illustrative purposes only. Those skilled in the art will appreciate that modifications can be made to the embodiments shown without departing from the scope of the invention.

What is claimed is:

1. A load beam or load beam component for a disk drive suspension assembly having a rigid region with concurrently formed side rails and sag region, comprising:
   a major surface with first and second edges each having a plurality of segments, including at least one segment having an arcuate shape, and a smooth transition region between each of the segments;
   first and second formed side rails extending from the first and second edges along each of the segments and transition regions and having a smooth transition between each of the segments; and
   a non-planar sag region extending from the first side rail to the second side rail in the major surface adjacent to the transition region formed concurrently with the forming of the first and second side rails, the sag region forming a smooth transition between the portions of the major surface adjacent to the segments.

2. The load beam or load beam component of claim 1, wherein at least one of the plurality of segments has a concave shape with respect to a longitudinal axis of the rigid region.

3. The load beam or load beam component of claim 1, wherein at least one of the plurality of segments has a convex shape with respect to a longitudinal axis of the rigid region.

4. The load beam or load beam component of claim 1, wherein a first segment at a proximal end of the rigid region has a concave shape with respect to a longitudinal axis of the rigid region and extends distally to a second segment having a convex shape with respect to the longitudinal axis of the rigid region.

5. The load beam or load beam component of claim 1, wherein the plurality of segments of the first edge of the major surface have a complementary shape with the plurality of segments of the second edge of the major surface.

6. The load beam or load beam component of claim 1, wherein the rigid region includes a plurality of apertures formed through the major surface of the load beam.

7. The load beam or load beam component of claim 6, wherein at least one of the apertures is positioned adjacent to the sag region.

8. The load beam or load beam component of claim 1, wherein the height of at least one of the first and second side rails varies along the length of the side rail.

9. The load beam or load beam component of claim 1, wherein the angle between the major surface and at least one of the first and second side rails varies along the length of the side rail.

* * * * *